United States Patent [19]

Gross et al.

[11] Patent Number: 5,440,007

[45] Date of Patent: Aug. 8, 1995

[54] COMPOSITION OF AND METHOD FOR FORMING HIGH MOLECULAR WEIGHT PREDOMINANTLY SYNDIOTACTIC SUBSTITUTED-POLY (β-PROPIOESTERS)

[75] Inventors: Richard A. Gross, Chelmsford; John E. Kemnitzer, Dracut; Stephen P. McCarthy, Tyngsboro, all of Mass.

[73] Assignee: University of Massachusetts Lowell, Lowell, Mass.

[21] Appl. No.: 232,870

[22] Filed: Apr. 25, 1994

Related U.S. Application Data

[63] Continuation of Ser. No. 965,134, Oct. 22, 1992, abandoned.

[51] Int. Cl.⁶ .................................................. C08G 63/08
[52] U.S. Cl. ................................. 528/354; 525/408; 525/413; 525/415; 528/357; 528/361
[58] Field of Search ........................ 528/354, 357, 361; 525/413, 415

[56] References Cited

U.S. PATENT DOCUMENTS

| | | | |
|---|---|---|---|
| 4,090,996 | 5/1978 | Gergen et al. | 524/585 |
| 4,719,246 | 1/1988 | Murdoch et al. | 525/415 |
| 4,766,182 | 8/1988 | Murdoch et al. | 525/413 |
| 4,800,219 | 1/1989 | Murdoch et al. | 525/413 |
| 4,902,515 | 2/1990 | Loomis et al. | 424/486 |
| 4,981,696 | 1/1991 | Loomis et al. | 424/486 |

OTHER PUBLICATIONS

Kricheldorf et al., "Anionic and Pseudoanionic Polymerization of Lactones—A Comparison", *Makromol. Chem., Macromol. Symp* 32:285–298 Apr./(1990).

Hans R. Kricheldorf et al., "Polylactones. 20. Polymerization of ε-Caprolactone with Tributyltin Derivatives": A Mechanistic Study, *Macromolecules*, 24:1944–1949 Apr./(1991).

Hans R. Kricheldorf et al., "Poly(lactones).9.Polymerization Mechanism of Metal Alkoxide Initiated Polymerizations of Lactide and Various Lactones", *Macromolecules*, 21:286–293 Feb./(1988).

Primary Examiner—Melvyn I. Marquis
Assistant Examiner—Shelley A. Dodson
Attorney, Agent, or Firm—Hamilton, Brook, Smith & Reynolds

[57] ABSTRACT

High molecular weight, biodegradable polymers of substituted-poly(β-propioesters), wherein the repeat unit sequences have a predominantly syndiotactic arrangement and a method of forming such polymers are disclosed. The method includes exposing a substituted-β-propiolactone to a tin-based organometallic catalyst for a sufficient combination of time and temperature to form the predominantly syndiotactic substituted-poly(β-propioester).

17 Claims, 4 Drawing Sheets

COMPOSITION OF AND METHOD FOR FORMING HIGH MOLECULAR WEIGHT PREDOMINANTLY SYNDIOTACTIC SUBSTITUTED-POLY (β-PROPIOESTERS)

RELATED APPLICATION

This application is a continuation of application Ser. No. 07/695,134 filed Oct. 22, 1992, abandoned.

BACKGROUND OF THE INVENTION

Naturally-occurring poly(β-hydroxyalkanoates) (abbreviated as PHA) are a class of biodegradable polymers which have been the subject of increasing interest as a material which can be employed in disposable articles and specialty medical products. Generally, these polymers exhibit biologically-mediated environmental degradability, hydrolytic degradation and have been shown to possess advantageous characteristics when used in vivo. Among the most well-known PHA's are homopolymers of poly(β-hydroxybutyrate) (abbreviated as PHB). See, for example, Brandl et al., *Adv. in Biochem. Eng./Biotech.*, 41:77 (1990); Doi, Y., *Microb. Polyesters*, VCH Publishers: New York (1990); and Steinbuchel et al., *Mole. Microb.*, 5(3):535 (1991).

However, the rate of biodegredation of PHA can be affected by altering the stereochemistry of the polymer. For example, crystalline, naturally-occurring PHB and its synthetic analogue, synthesized by ring-opening [R]-β-methyl β-propiolactone, have been prepared. These PHB's are composed of only [R]-enantiomers, wherein the β-methyl substituent groups are arranged in a stereoregular isotactic repeat unit sequence. This polymer structure generally exhibits relatively rapid rates of biodegredation in a variety of disposal environments. However, synthetic PHB's, which are composed of 50% [R]- and [S]-repeat units, where the β-methyl substituent groups are arranged in an atactic configuration, have shown considerably slower degradation kinetics. In fact, the sustained biodegradability of atactic PHB, beyond initial surface degradation, is questionable at present. Furthermore, 50% [R] isotactic PHB, which has blocks of [R]-PHB and [S]-PHB chain segments, has thus far shown poor degradation characteristics.

In addition, methods for forming synthetic 50% [R]-PHB have produced atactic polymers of high molecular weight, as well as low molecular weight polymers with partial stereoregulation, whose range of useful applications are significantly limited. See, for example, Kricheldorf et al., *Macromolecules*, 24:1944 (1991).

Therefore, a need exists for substituted-poly(β-propioesters), and a method of forming such polymers, which overcome the above-mentioned problems.

SUMMARY OF THE INVENTION

The present invention relates to a high molecular weight, predominantly syndiotactic substituted-poly(β-propioester) polymer. This polymer comprises substituted-β-propioester repeat units which are distributed in a predominantly syndiotactic stereosequence. The method for said polymer comprises forming a high molecular weight predominantly syndiotactic substituted-poly(β-propioester) includes exposing a racemic substituted-β-propiolactone monomer to an organometallic catalyst under conditions sufficient to form a predominantly syndiotactic substituted-poly(β-propioester).

This invention has many advantages. For example, high molecular weight polymers of the present invention can be formed which have various degradation rates. Furthermore, the predominantly syndiotactic substituted-poly(β-propioesters) are elastomers with good flexibility, tensile strength and elongation-to-break. Finally, these crystalline predominantly syndiotactic polymers are melt processable. Thus, these polymers are suited for use, for example, in medical implants as microcapsules to give controlled, reliable releases of therapeutic drugs contained therein. In addition, these poly(β-propioesters) can be employed in environmentally-safe degradable polymer applications.

DETAILED DESCRIPTION OF THE INVENTION

The features and other details of the invention, either as steps of the invention or as combinations of parts of the invention, will now be more particularly described and pointed out in the claims. It will be understood that the particular embodiments of the invention are shown by way of illustration and not as limitations of the invention. The principle features of this invention can be employed in various embodiments without departing from the scope of the invention.

The present invention relates to a composition and a method of forming high molecular weight polymers of predominantly syndiotactic substituted-poly(β-propioesters). A high molecular weight polymer, as defined herein, is a polymer having a number average molecular weight ($M_n$) of greater than or equal to about 2,000 grams/mole.

In one embodiment of the method for forming the high molecular weight, biodegradable, predominantly syndiotactic polymer of the present invention, a suitable substituted-β-propiolactone racemic monomer is mixed with an organometallic initiator to form a reaction solution. In one embodiment, the substituted-β-propiolactone monomer contains at least one substituent, which is selected from the group consisting essentially of protected amino, protected thiol, protected hydroxyl, vinyl, alkyl, aryl, halogenated alkyl, halogenated aryl and esters functional groups. In a preferred embodiment, the substituted-β-propiolactone is racemic β-methyl β-propiolactone, which has the following structural formula:

where Me is a methyl group.

Examples of suitable organometallic initiators are those containing tin, including tri(n-butyl)tin methoxide, Sn(n-Bu)$_3$OCH$_3$, di(n-butyl)tin dimethoxide, Sn(n-Bu)$_2$(OCH$_3$)$_2$, bis(tri(n-butyl)tin) oxide, ((n-Bu)$_3$Sn)$_2$O, bis(triphenyltin) oxide, ((Ph)$_3$Sn)$_2$O, and tin bis(acetylacetonate), (C$_5$H$_7$O$_2$)$_2$Sn. Preferably, the organometallic initiator is di(n-butyl)tin dimethoxide, which has the following molecular structure:

where Me is a methyl group and n-Bu is a n-butyl group. The organometallic initiator is added in its pure form or is dissolved in a solvent prior to mixing with the substituted-propiolactone monomer. In a particularly preferred embodiment, the organometallic initiator is used in its pure form.

A suitable ratio of the substituted-$\beta$-propiolactone racemic monomer and the organometallic initiator are mixed. Reaction solutions composed of substituted-$\beta$-propiolactone racemic monomer mixtures and organometallic initiator, with molar ratios from about 35:1 to 5600:1 monomer-to-initiator, are examples of suitable ratios. The reaction solution is then exposed to conditions sufficient to cause the monomer to polymerize and form a high molecular weight, predominantly syndiotactic substituted-poly($\beta$-propioester).

An example of a suitable combination of time and temperature is that time after mixing, during which the reaction solution is maintained at a temperature between 0° C. and 90° C. until the reaction solution becomes highly viscous.

The substituted-$\beta$-propiolactone monomer polymerizes to form a polymer containing substituted-$\beta$-propioester repeat units which have a predominantly syndiotactic repeat unit sequence distribution. A substituted-$\beta$-propioester repeat unit is the chemical unit, resulting from substituted-$\beta$-propiolactone polymerization, and has the chemical formula C$_3$H$_3$O$_2$R. In this substituted-$\beta$-propioester repeat unit, R is selected from the group consisting essentially of protected amino, protected thiol, protected hydroxyl, vinyl, alkyl, aryl, halogenated alkyl, halogenated aryl and ester functional groups.

The high molecular weight, predominantly syndiotactic substituted-$\beta$-poly($\beta$-propioester), formed from $\beta$-substituted-$\beta$-propiolactone has the following stereochemical arrangement:

($\beta$-substituted).

Additionally, the high molecular weight, predominantly syndiotactic substituted-$\beta$-poly($\beta$-propioester), formed from $\alpha$-substituted-$\beta$-propiolactone has the following stereochemical arrangement:

($\alpha$-substituted).

Finally, the high molecular weight, predominantly syndiotactic substituted-$\beta$-poly($\beta$-propioesters), formed from $\alpha,\beta$-substituted-$\beta$-propiolactone have one of the following stereochemical arrangements:

($\alpha,\beta$-substituted)

($\alpha,\beta$-substituted).

R, R$_1$ and R$_2$ are selected from the group consisting essentially of protected amino, protected thiol, protected hydroxyl, vinyl, alkyl, halogenated alkyl, halogenated aryl and esters functional groups, wherein the halogenated alkyl and halogenated aryl functional groups have between about one and thirteen carbons per function group.

A predominantly syndiotactic polymer is defined herein as a polymer chain wherein the dyads (or adjacent monomer pairs) have a mole fraction of racemic or syndiotactic dyads of greater than about 0.50. Specifically, a syndiotactic polymer contains a chain herein [R] and [S] enantiomers are placed such that in the polymer chain [R]-enantiomers are followed predominantly by [S]-enantiomers and [S]-enantiomers are followed predominantly by [R]-enantiomers (i.e., [R]-[S]-[R]). The degree of syndiotacticity is measured as the mole fraction of syndiotactic dyads which is greater than about 0.50 and equals 1.0 perfect syndiotactic stereoregulation. Herein, the names of predominantly syndiotactic polymers indentifies he mole fraction of syndiotactic dyads contained in said polymer. For example, the mole fraction of syndiotactic dyads in a 0.66-syndiotactic substituted-poly($\beta$-propioester) is 0.66.

In a particularly preferred embodiment, the reaction solution contains proportions of racemic $\beta$-methyl $\beta$-propiolactone (($\pm$)-MPL) monomers and di(n-butyl)tin dimethoxide initiator with a molar ratio of between 35:1 and 5600:. Also, the polymerization is preferably conducted at temperatures between 0° C. and 90° C. for periods of time between 2 and 13 days until the freely flowing liquid becomes highly viscous. Further, in the preferred embodiment, this polymerization of (±)-MPL with a di(n-butyl)tin dimethoxide initiator will result in the formation of a high molecular weight, crystalline predominantly syndiotactic poly(β-methyl β-propioester) with the following stereochemical arrangement:

where Me is a methyl group and "n" is greater than or equal to about 12.

In another embodiment a diblock copolymer is formed containing a predominantly syndiotactic substituted-poly(β-propioester) component and a polyester component. In this embodiment, a substituted-β-propiolactone and an organometallic initiator, with a molar ratio of between 35:1 and 5600:1, is maintained for a suitable time and temperature to form high molecular weight, predominantly syndiotactic substituted-poly(β-propioester). The high molecular weight, predominantly syndiotactic substituted-poly(β-propioester) is then exposed to alcoholysis to form a prepolymer having a hydroxyl end-group and an ester end-group. In an alternative embodiment, the high molecular weight, predominantly syndiotactic substituted-poly(β-propioester) is used as a prepolymer without performing alcoholysis. A prepolymer is then exposed to a suitable organometallic molecule, such as triethyl aluminum, under conditions sufficient to cause the organometallic molecule to react with a hydroxyl end-group of said prepolymer and thereby form a macroinitiator which consists of the alkoxide of the high molecular weight, predominantly syndiotactic substituted-poly(β-propioester) which is chelated to a suitable organometallic group, such as diethyl aluminum. The macroinitiater is then reacted with a suitable lactone to form a diblock copolymer.

Alternatively, a block copolymer is formed containing a predominantly syndiotactic substituted-poly(β-propioester) component and a polyester component or a polysaccharide component. A suitable ratio of predominantly substituted-poly(β-propioester) and polyester, or polysaccharide, are mixed and then exposed to a suitable transesterification catalyst under conditions sufficient to form a block copolymer including a predominantly syndiotactic component.

In one embodiment, the invention comprises a biodegradable blend of polymers comprising a high molecular weight predominantly syndiotactic substituted-poly(β-propioester), having a number average molecular weight of at least about 2,000 grams/mole, and at least one other polymer. The biodegradable blend of polymers is, for example, a polyblend, which is defined by Hawley's Condensed Chemical Dictionary (12th ed. 1993) as "a combination in any proportion of either (1) two homopolymers (natural or synthetic), (2) a homopolymer and a copolymer, or (3) two copolymers." The other polymers of the biodegradable blend can include for example, poly(ε-caprolactone), cellulose acetate, wherein the degree of acetate substitution is between about 1.7 and 2.5 units of cellulose per acetate unit, natural-origin poly 3-hydroxy alkanoates, and polylactic acid. The weight percent of the other polymer components is in the range of between about 1 and 99 percent.

The invention will now be further and specifically described by the following examples. All parts and percentages are by weight unless otherwise stated.

Exemplification

Instrumental Methods

Nuclear Magnetic Resonance (NMR). Carbon ($^{13}$C) NMR spectra were recorded on a Brucker Instruments, Inc. WP-270 SY spectrometer at 67.9 MHz with chemical shifts in parts per million (ppm) referenced relative to chloroform as an internal reference at 77.00 ppm. The parameters for the polymer spectra were as follows: 4.0% wt/wt polymer in CDCl$_3$, temperature 308° K., pulse width 10 μseconds, 16000 data points, relaxation delay 1.0 second, and 32000–35000 transients.

To quantify the racemic and meso dyads, $^{13}$C NMR measurements were recorded with parameters the same as above with the exception that the spectral acquisition window was narrowed to include only the carbonyl resonances giving spectral resolution of 0.222 Hz/pt, compared with 1.89 Hz/pt over the 0 to 200 ppm range above.

To determine the structure of the water-soluble enzymatic degradation products, hydrogen ($^1$H) NMR spectra were recorded on a Brucker Instruments, Inc. WP-270 SY spectrometer at 270 MHz. The parameters for the spectra were as follows: 3.5% wt/wt polymer in CDCl$_3$, temperature 308° K., pulse width 4.9 μseconds, 32000 data points, relaxation delay 0.50 seconds, and 100–200 transients.

Molecular Weight Measurements. The number average molecular weights (Mn) of polymer samples were determined by gel permeation chromatography (GPC). GPC also allowed calculation of the molecular weight distribution (Mw/Mn), where Mw is the weight average molecular weight. Studies by GPC were carried out using a Waters, Inc. Model 510 pump, a Model 410 refractive index detector, and a Model 730 data module with 10$^3$ Å through 10$^6$ Å ultrastyragel columns in series. Chloroform was used as the eluent at a flow rate of 1.0 milliliters per minute. Sample concentrations of 0.3% w/v and injection Volumes of 125 microliters were used. Polystyrene standards with a low polydispersity, obtained from Polysciences, Inc., were used to generate a calibration curve.

Thermal Analysis. Differential scanning calorimetry (DSC) was conducted on a 2910 differential scanning calorimeter, commercially available from E. I. du Pont de Nemours & Co., equipped with a TA 2000 data station, using between 7.0–12.0 mg of sample, a heating rate of 10° C./minute and a nitrogen purge.

X-ray Diffraction. X-ray diffraction measurements were made on packed powder samples at 25° C. using a Rigaku Geigerflex Camera operating at a voltage of 40 kV and a current of 25 mAmps. The x-ray beam was pinhole collimated. Nickel-filtered CuK$_\alpha$radiation (λ=1,542 Å) was used. The sample exposure time was 12 hours and the sample-to-film distance was 4.96 cm.

Synthetic Procedures

Initial Preparation

Substantial precautions were taken to eliminate oxygen, or oxygen bearing compounds such as water, from the synthesis process. All glassware was silanized with dichlorodimethylsilane or trichloromethylsilane, washed with methanol, oven dried, and subsequently flame-dried under vacuum and purged with nitrogen or argon. All chemical transfers were performed by syringe through rubber septum caps under an argon atmosphere. Chloroform was washed with distilled water, dried over sodium sulfate, and distilled two times from phosphorus pentoxide under an argon atmosphere. Toluene was dried over calcium hydride, and distilled under an argon atmosphere. Tin organometallic compounds, obtained commercially from Aldrich Chemical Company, Inc., were purified by fractional distillation or were used as received. The tin organometallic compounds served as the polymerization initiator and catalyst. Immediately before transfer to a polymerization ampoule, racemic β-methyl β-propiolactone, obtained from Aldrich Chemical Company, Inc. at a purity of 98%, was dried over calcium hydride, with stirring, for 16 hours followed by fractional distillation, at 74° C. to 75.5° C. and 25 mm Hg, under an argon bleed.

Tri(n-butyl)tin Methoxide Initiator

Tri(n-butyl)tin methoxide, $Sn(n-Bu)_3OCH_3$, at a purity greater than 97%, was dissolved in chloroform to form a solution with a concentration of 0.825M $Sn(n-Bu)_3OCH_3$. Three grams (0.035 moles) of racemic β-methyl β-propiolactone (hereinafter abbreviated (±)-MPL) and 0.35 mL of 0.825M $Sn(n-Bu)_3OCH_3$ were transferred into 10 mL internal volume ampoules capped with rubber septa. The ratio of (±)-MPL monomer to $Sn(n-Bu)_3OCH_3$ initiator was about 120-to-1. The ampoules were then purged with argon and subsequently sealed under a vacuum of approximately 150 mm Hg. The ampoules were then placed into separate constant temperature baths at 40°, 60°, 75° and 90° C. for 55, 25, 18 and 13 days, respectively, wherein the (±)-MPL was polymerized to form predominantly syndiotactic PHB (hereinafter abbreviated syn-PHB).

Di(n-butyl) tin Dimethoxide Initiator

Liquid di(n-butyl) tin dimethoxide, $Sn(n-Bu)_2(OCH_3)_2$, was used as received. Three grams (0.035 moles) of (±)-MPL and 0.1744 grams ($5.91 \times 10^{-4}$) $Sn(n-Bu)_2(OCH_3)_2$ were transferred into 10 mL internal volume ampoules capped with rubber septa. The ratio of (±)-MPL monomer to $Sn(n-Bu)_2(OCH_3)_2$ initiator used was approximately 59-to-1. The ampoules were then purged with argon and subsequently sealed under a vacuum of approximately 150 mm Hg. The ampoules were then placed into separate constant temperature baths at 0°, 25°, 40°, 60°, 75° and 90° C. for 13, 4, 2, 2 and 2 days, respectively, wherein the (±)-MPL polymerized to form syn-PHB.

Bis(tri(n-butyl)tin) Oxide Initiator

Liquid bis(tri(n-butyl)tin) oxide, $((n-Bu)_3Sn)_2O$, with a purity of 96%, was used as is. Three grams (0.035 moles) of (±)-MPL) and 0.3581 grams ($6.01 \times 10^{-4}$) of $((n-Bu)_3Sn)_2O$ were transferred into 10 mL internal volume ampoules capped with a rubber septa. The ratio of (±)-MPL monomer to $((n-Bu)_3Sn)_2O$ initiator was about 58-to-1. The ampoules were then purged with argon and subsequently sealed under a vacuum of approximately 150 mm Hg. The ampoules were then placed into separate constant temperature baths at 40°, 60°, 75° and 90° C. for 34, 8, 8 and 8 days, respectively, wherein the (±)-MPL polymerized to form syn-PHB.

Bis(triphenyltin) oxide Initiator

Bis(triphenyltin) oxide, $((Ph)_3Sn)_2O$, with a purity of 97% was dissolved in toluene to form a solution with a concentration of 0.50M $((Ph)_3Sn)_2O$. Three grams (0.035 moles) of (±)-MPL and 1.20 mL of 0.50M $((Ph)_3Sn)_2O$ were transferred into 10 mL internal volume ampoules capped with rubber septa. The ratio of (±)-MPL monomer to $((Ph)_3Sn)_2O$ initiator was approximately 58-to-1. The ampoules were then purged with argon and subsequently sealed under a vacuum of approximately 150 mm Hg. The ampoules were then placed into separate constant temperature baths at 40°, 60°, 75° and 90° C. for 34, 13, 13 and 11 days, respectively, wherein the (±)-MPL polymerized to form syn-PHB.

Tin Bis(acetylacetonate) Initiator

Tin Bis(acetylacetonate),$(C_5H_7O_2)_2Sn$, was prepared utilizing a known procedure. See Wakeshima et al., *Chemistry Letters*, 93 (1981). The $(C_5H_7O_2)_2Sn$ was added via syringe. Three grams (0.035 moles) of (±)-MPL and 0.0860 grams ($2.71 \times 10^{-4}$ moles) of $(C_5H_7O_2)_2Sn$ were transferred into a 10 mL internal volume ampoule capped with a rubber septum. The ratio of (±)-MPL monomer to $(C_5H_7O_2)_2Sn$ initiator was approximately 100-to-1. The ampoule was then purged with argon and subsequently sealed under a vacuum of approximately 150 mm Hg. The ampoule was then placed into a constant temperature bath at 75° C. for 28 days, wherein the (±)-MPL polymerized to form syn-PHB.

Syn-PHB Purification

The 50%-[R]-syn-PHB samples were purified by solution precipitation. The contents of each ampoule were separately dissolved in 4 mL of chloroform which was then poured into 125 mL of a 2.5-to-1 hexane/diethyl ether solution, or 125 mL of methanol, and cooled to a temperature between −5° and 0° C. for a period of 3 to 7 hours to form a predominantly syndiotactic PHB precipitate. The syn-PHB precipitate was separated from the supernatant by decanting and was then air dried.

The syn-PHB precipitate was further purified by reprecipitation by dissolving the syn-PHB precipitate in 10 mL of acetyl acetone and stirring the syn-PHB solution for approximately 12 hours at 25° C. The syn-PHB solution was then mixed with 100 mL of a 1-to-1 hexane/diethyl ether solution, or 100 mL of methanol, to reprecipitate the syn-PHB. The syn-PHB precipitate was separated from the supernatant by decanting, triturated twice with 10 mL portions of 1-to-1 hexane/diethyl ether, or methanol, and then dried at 30° C. in vacuo at a pressure of 50 μm Hg for 24 hours. The purification produced a syn-PHB product that appeared as a white powder.

Syn-PHB Polymer Analysis

The polymerization of (±)-MPL, initiated by a tin organometallic compound, provided yields of up to 95% syn-PHB polymer, as shown in Table I. GPC measurements gave relatively high molecular weight (Mn) values, reported in Table I, for the syn-PHB polymers ranging between approximately 3000 to 77000 grams/mole. The Mn values for syn-PHB produced generally increased with higher [M]/[I] ratios. This increase in the molecular weight of syn-PHB suggests that Mn is dependent upon the [M]/[I] ratio. Furthermore, as shown in Table I, polymerization of (±)-MPL with a $Sn(n-Bu)_2(OCH_3)_2$ catalyst produced high viscosity reaction solutions, and the corresponding high molecular weight syn-PHB samples, in the shortest reaction time periods. This suggests that the $Sn(n-Bu)_2(OCH_3)_2$ catalyst, relative to the other tin organometallic catalysts, results in the most rapid (±)-MPL polymerization kinetics.

Finally, the dispersitiy (Mw/Mn) of the syn-PHB products ranged from 1.04 to 1.83, as provided in Table I. The dispersity values were dependent upon the polymerization temperature for the syn-PHB samples, with lower polymerization temperatures generally resulting in lower dispersity values.

Figure 1:
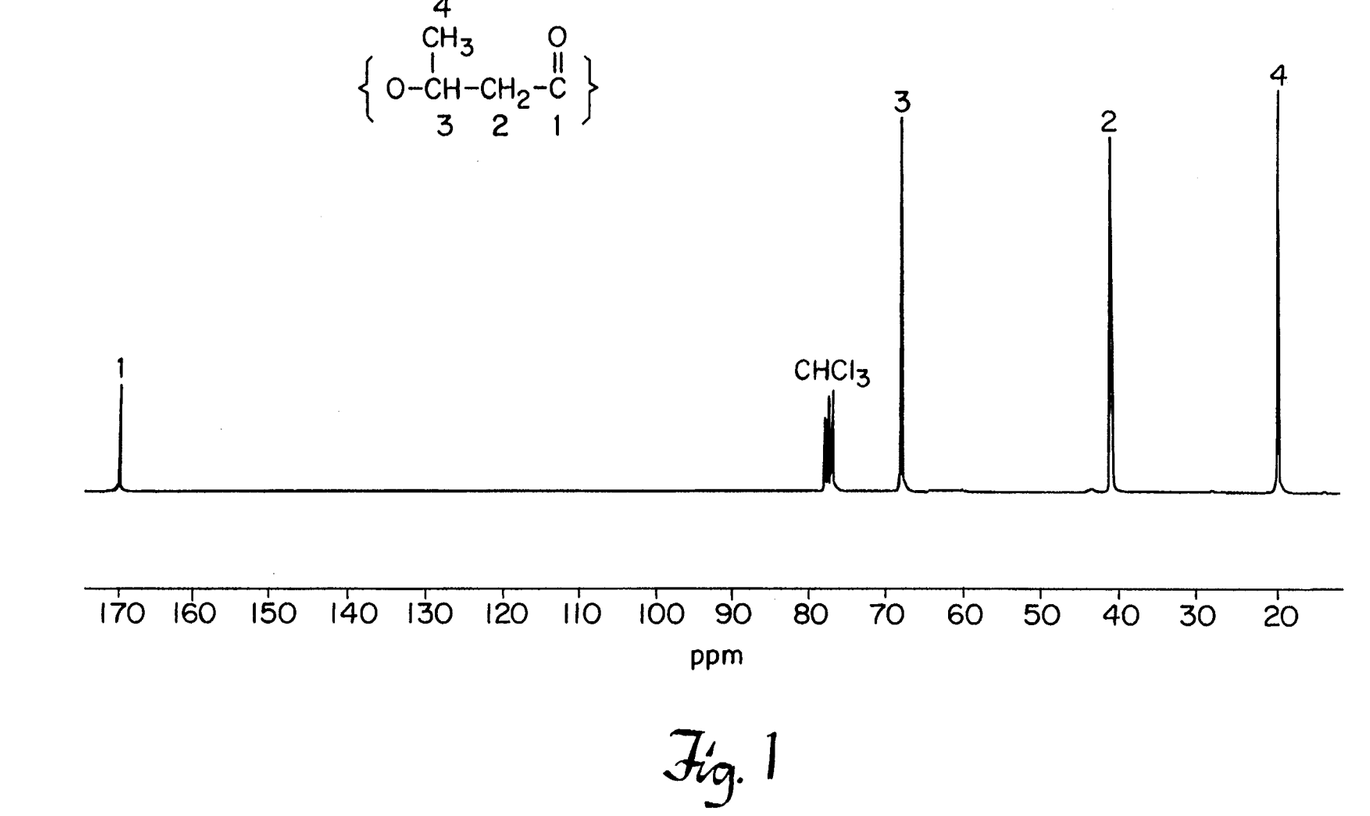
FIG. 1 is a 13C NMR spectrum at 35° C. in CDCl$_3$ of a syndiotactic PHB of this invention having a 0.70 mole fraction of syndiotactic dyads.
Figure 2:
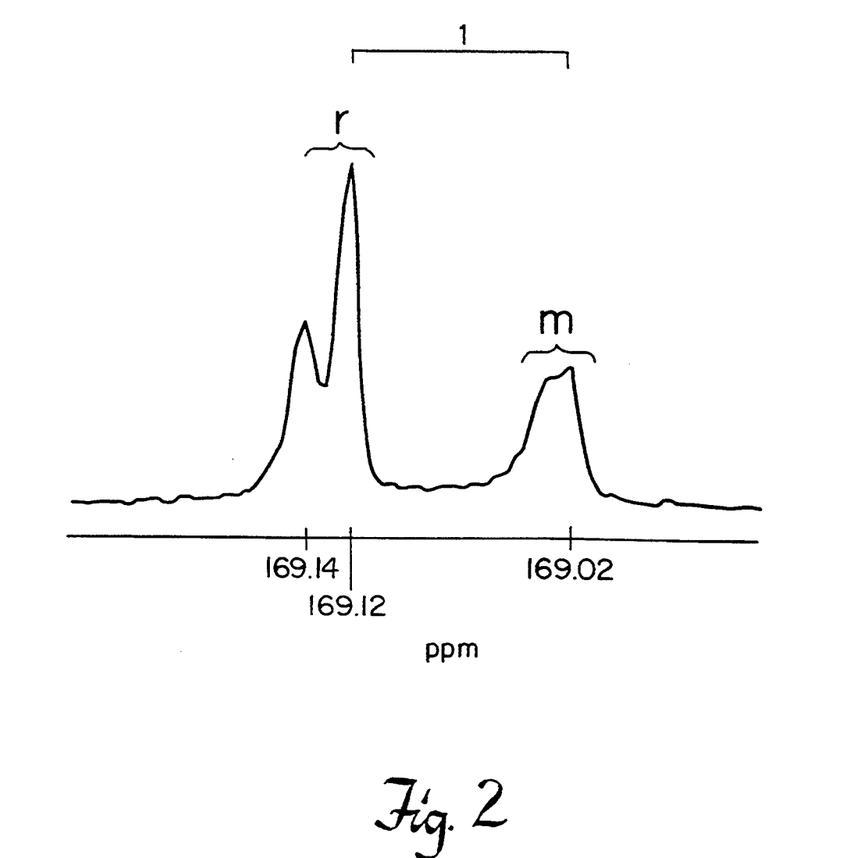
FIG. 2 is a plot of the carbonyl carbon signal region of the spectrum in FIG. 1.

The $^{13}C$ NMR spectra of the syn-PHB polymer samples obtained were recorded as a means to quantify the tacticity of each syn-PHB sample which is presented as the mole fraction of syndiotactic dyads. FIG. 1 shows the $^{13}C$ NMR spectrum of the 0.70-syn-PHB polymer sample (syn-PHB sample #10) produced using Sn(n-Bu)$_3$OCH$_3$ as an initiator at 40° C. FIG. 2 provides the $^{13}C$ NMR spectrum of the carbonyl carbon region of this 0.70-syn-PHB sample. This spectrum was obtained by using a higher digital resolution and a narrower spectral window. The repeat unit stereosequence distribution of this 0.70-syn-PHB polymer was evaluated through examination of the carbonyl carbon region of FIG. 2, wherein the upfield NMR signal, at 169.02 ppm, having additional complexity, corresponds to the two meso (or isotactic) dyad sequences ([R]-[R] or [S]-[S]) while the partially resolved downfield doublet, at 169.12/169.14 ppm, corresponds to the two racemic dyad sequences ([R]-[S] or [S]-[R]). The two racemic dyad peaks observed were expected due to the effects of directionality across the ester linkage. The meso and racemic dyad fractions, thus the degree of syndiotacticity, for each syn-PHB polymer sample, were calculated by conducting a spectral integration of the meso and racemic peaks of the $^{13}C$ NMR spectrum of the carbonyl carbon region. Justification for using this approach to quantify the degree of syndiotacticity is available from literature references. See Tanahashi et al., *Macromolecules*, 24:5732 (1991, Bloembergen et al., *Macromolecules*, 22:1656 (1989), and Doi et al., *Macromolecules*, 19:2860 (1986). The values of the racemic fractions are reported in Table I.

Figure 3:
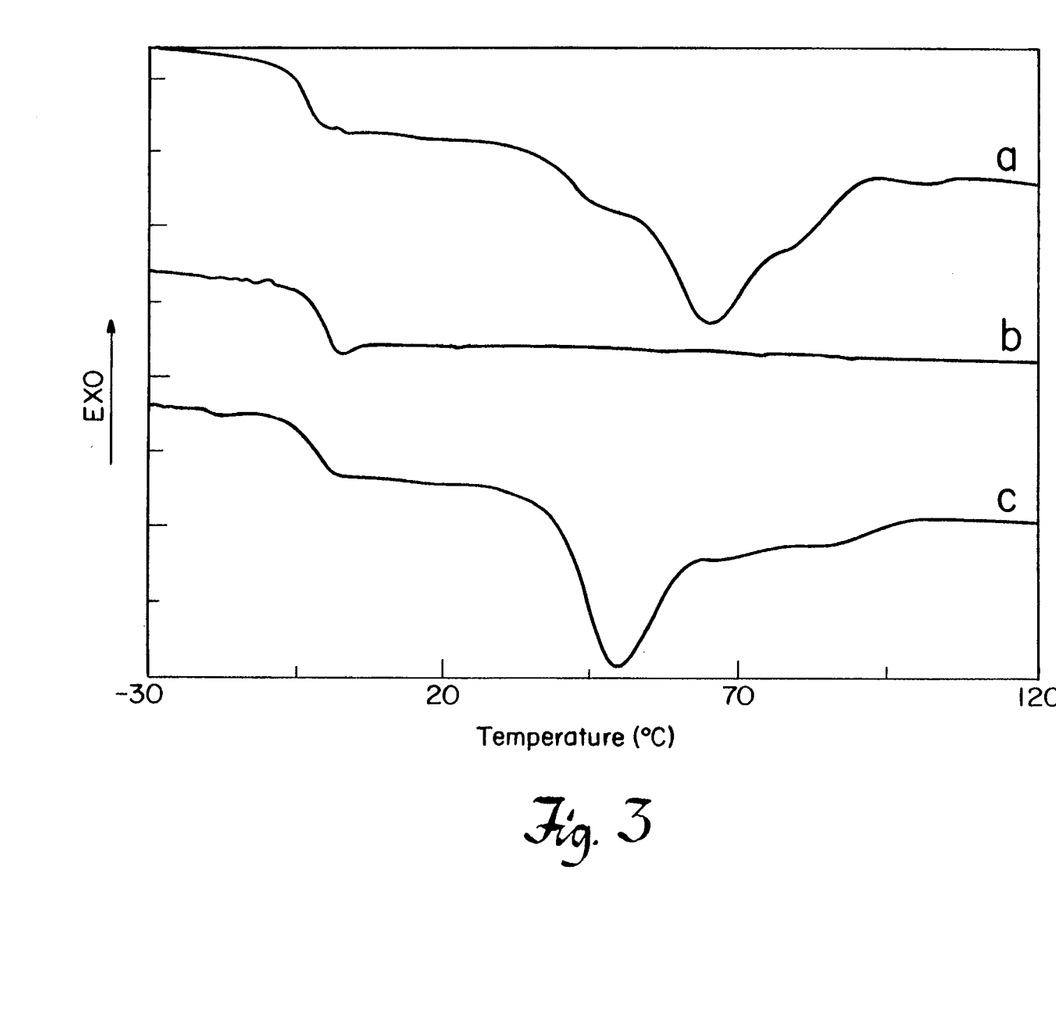
FIG. 3 are DSC thermograms of a syndiotactic PHB of this invention, having a 0.63 mole fraction of syndiotactic dyads, obtained using a heating rate of 10° C./minute.

DSC thermograms for the 0.63-sy-PHB polymer sample (syn-PHB sample #12), produced using a Sn(n-Bu)$_3$OCH$_3$ initiator at 75° C., are shown in FIG. 3. Thermogram "a" was recorded for the 0.63-syn-PHB sample obtained by solution precipitation during the first heating cycle. Three distinct melting point endotherms for precipitated solids were observed at peak temperatures of approximately 48, 65 and 80° C.

Thermogram "b" was recorded during the second heating scan of the 0.63-syn-PHB sample and was conducted immediately after quenching the 0.63-syn-PHB sample from the melt after the first heating scan. No melting endotherm corresponding to that of a crystalline phase was observed.

Finally, Thermogram "c" was recorded during the third heating scan and was performed upon the same 0.63-syn-PHB sample after annealing. Three distinct melting point endotherms were also observed with peak temperatures of approximately 50, 69 and 86° C. The lack of an endotherm during the second heating scan, that was observed in the first heating scan and reappeared in the third heating scan, after a 55 day annealing period, suggested that the transition corresponded to crystalline melting. Additionally, the thermogram results from the second heating scan suggested that the crystallization kinetics from the melt were not exceedingly rapid since neither a crystallization exotherm nor a melting endotherm was observed. In addition, for the syn-PHB polymers produced, using the Sn(n-Bu)$_3$OCH$_3$ initiator at various polymerization temperatures, a compilation of the values, from DSC thermograms, for the glass transition ($T_g$), peak melting transition ($T_m$), and enthalpy of fusion over the entire melting point range ($\Delta H_f$) are presented in Table II.

TABLE II

| Syn-PHB Sample | Syn-Mole Fraction | $T_g{}^a$ (°C.) | $T_m{}^b$ (°C.) | $\Delta H_f{}^c$ (g/cal) |
|---|---|---|---|---|
| 10 | 0.70 | −8.2 | 58.5 | 8.52 ± 0.12 |
| 11 | 0.66 | −6.0 | 64.7 | 8.57 ± 0.03 |
| 12 | 0.63 | −2.5 | 65.3 | 6.84 ± 0.09 |

TABLE I

| Polymer Sample | Initiator | Temp. (°C.) | Time (Days) | [M]/[I] Ratio | Yield (%) | Syn-Dyad Fraction | Mn | Mw/Mn |
|---|---|---|---|---|---|---|---|---|
| 1 | Sn(n-Bu)$_2$(OCH$_3$)$_2$ | 0 | 13 | 59:1 | 43 | 0.73 | 3420 | 1.25 |
| 2 | Sn(n-Bu)$_2$(OCH$_3$)$_2$ | 25 | 4 | 59:1 | 42 | 0.68 | 3670 | 1.55 |
| 3 | Sn(n-Bu)$_2$(OCH$_3$)$_2$ | 40 | 2 | 59:1 | 62 | 0.67 | 4280 | 1.67 |
| 4 | Sn(n-Bu)$_2$(OCH$_3$)$_2$ | 60 | 2 | 59:1 | 31 | 0.63 | 6190 | 1.84 |
| 5 | Sn(n-Bu)$_2$(OCH$_3$)$_2$ | 60 | 2 | 680:1 | 94 | 0.63 | 45100 | 1.69 |
| 6 | Sn(n-Bu)$_2$(OCH$_3$)$_2$ | 60 | 12 | 2810:1 | 82 | 0.61 | 77000 | 1.92 |
| 7 | Sn(n-Bu)$_2$(OCH$_3$)$_2$ | 75 | 2 | 59:1 | 24 | 0.55 | 7270 | 1.66 |
| 8 | Sn(n-Bu)$_2$(OCH$_3$)$_2$ | 75 | 7 | 1200:1 | 95 | N.D.$^a$ | 29600 | 1.83 |
| 9 | Sn(n-Bu)$_2$(OCH$_3$)$_2$ | 90 | 2 | 59:1 | 11 | 0.54 | 6430 | 1.67 |
| 10 | Sn(n-Bu)$_3$OCH$_3$ | 40 | 55 | 120:1 | 37 | 0.70 | 5300 | 1.04 |
| 11 | Sn(n-Bu)$_3$OCH$_3$ | 60 | 25 | 120:1 | 55 | 0.66 | 7700 | 1.06 |
| 12 | Sn(n-Bu)$_3$OCH$_3$ | 75 | 18 | 120:1 | 69 | 0.63 | 9200 | 1.12 |
| 13 | Sn(n-Bu)$_3$OCH$_3$ | 75 | 21 | 204:1 | 70 | 0.62 | 25100 | 1.38 |
| 14 | Sn(n-Bu)$_3$OCH$_3$ | 75 | 7 | 267:1 | 30 | 0.66 | 5050 | 1.96 |
| 15 | Sn(n-Bu)$_3$OCH$_3$ | 75 | 7 | 267:1 | 7 | 0.62 | 4280 | 1.72 |
| 16 | Sn(n-Bu)$_3$OCH$_3$ | 75 | 7 | 267:1 | 63 | 0.62 | 1270 | 2.21 |
| 17 | Sn(n-Bu)$_3$OCH$_3$ | 90 | 13 | 120:1 | 24 | 0.61 | 5000 | 1.07 |
| 18 | (n-Bu$_3$Sn)$_2$O | 40 | 34 | 58:1 | 53 | 0.67 | 6520 | 1.36 |
| 19 | (n-Bu$_3$Sn)$_2$O | 60 | 8 | 58:1 | 39 | 0.64 | 8850 | 1.55 |
| 20 | (n-Bu$_3$Sn)$_2$O | 75 | 8 | 58:1 | 61 | 0.63 | 9670 | 1.80 |
| 21 | (n-Bu$_3$Sn)$_2$O | 90 | 8 | 58:1 | 51 | 0.58 | 11400 | 1.73 |
| 22 | (Ph$_3$Sn)$_2$O | 40 | 34 | 63:1 | 40 | 0.70 | 3690 | 1.29 |
| 23 | (Ph$_3$Sn)$_2$O | 60 | 13 | 63:1 | 70 | 0.67 | 8170 | 1.76 |
| 24 | (Ph$_3$Sn)$_2$O | 75 | 13 | 63:1 | 67 | 0.64 | 9010 | 1.94 |
| 25 | (Ph$_3$Sn)$_2$O | 75 | 19 | 390:1 | 91 | 0.60 | 24000 | 1.66 |
| 26 | (Ph$_3$Sn)$_2$O | 90 | 11 | 63:1 | 42 | 0.57 | 12500 | 1.62 |
| 27 | (C$_5$H$_7$O$_2$)$_2$Sn | 75 | 28 | 100:1 | 35 | 0.58 | 9890 | 1.62 |

$^{a)}$N.D. means not determined.

TABLE II-continued

| Syn-PHB Sample | Syn-Mole Fraction | $T_g{}^a$ (°C.) | $T_m{}^b$ (°C.) | $\Delta H_f{}^c$ (g/cal) |
|---|---|---|---|---|
| 14 | 0.61 | −9.0 | 59.8 | 7.44 ± 0.07 |

[a] Obtained during the second heating scan.
[b] $T_m$ value represents the peak melting temperature, specifically, the melting transition component that had the largest contribution to the total melting transition.
[c] Total enthalpy of fusion over the entire melting transition temperature range.

$T_m$ and $\Delta H_f$ values ranged from 59° to 65° C. and 6.8 to 8.6 calories/gram, respectively. The correspondence of the observed $T_m$ for a syn-PHB sample to a melting point transition was further verified by visual observation using a melting point apparatus. The visual observation of melting point showed that a solid-to-liquid transition occurred in the identical DSC temperature region which was assigned to the melting transition.

Analyses of X-ray diffractographs, of packed powder syn-PHB samples of the 0.70-syn-PHB polymer (syn-PHB polymer #10), produced using $Sn(n-Bu)_3OCH_3$ as an initiator at 40° C., and of a chemically-degraded, natural-origin [R]-PHB (Mn=4300) reference standard, were performed. The d-spacings of each diffractogram were calculated and compared with those reported for natural-origin [R]-PHB by Agostni et al., *J. of Polym. Sci.*, Part A-1, 2:2775 (1971) as shown in Table III.

TABLE III

| | d-Spacings (Å) | |
|---|---|---|
| Natural Origin [R]-PHB | Degraded Natural [R]-PHB | 0.70 Syndiotactic PHB |
| — | 13.97 ± .01 (vw)[a] | — |
| — | 7.17 ± .01 (vw) | — |
| — | — | 7.52 ± .04 (s)[a] |
| 6.55 (s) | 6.56 ± .02 (s) | — |
| 5.60 (w)[a] | 5.65 ± .03 (w) | — |
| — | — | 5.40 ± .02 (s) |
| 5.25 (s) | 5.18 ± .01 (s) | — |
| 4.48 (w) | 4.44 ± .00 (m)[a] | 4.42 ± .03 (s) |
| — | 4.10 ± .01 (s) | — |
| 3.98 (m) | 3.93 ± .05 (vw) | — |
| — | — | 3.83 ± .02 (m) |
| 3.53 (m) | 3.47 ± .01 (m) | 3.44 ± .01 (w) |
| 3.27 (w) | 3.24 ± .01 (m) | — |
| — | — | 3.11 ± .01 (w) |
| 2.94 (w) | 2.98 ± .01 (w) | — |
| 2.55 (w) | 2.58 ± .01 (vw) | — |
| — | 2.47 ± .01 (vw) | — |
| — | 2.35 ± .02 (vw) | 2.35 ± .01 (w)[b] |
| — | 2.22 ± .02 (vw) | — |
| — | 2.06 ± .01 (vw) | 2.06 ± .01 (w)[b] |

[a] Intensities: vw = very weak; w = weak; m = medium; and s = strong.
[b] d-spacings determined using a film-to-sample distance of 3.00 cm and a 12 hour exposure period on a packed powder sample.

The d-spacings for the 0.70-syn-PHB polymer sample suggest that predominantly syndiotactic PHB is crystalline and has distinctly different crystalline diffraction planes than those observed for isotactic, natural-origin 100%-[R]-PHB. The d-spacings unique to predominantly syndiotactic PHB are those at 7.52, 5.40, 3.83 and 3.11 Å.

PHB Polymer Biodegradability. Enzyme catalyzed short-term surface degradation and long-term degradation studies were conducted on PHB polymers.

For surface degradation studies, the PHB polymers tested were natural-origin 100%-[R] isotatic PHB, with a number average molecular weight of Mn=3700 grams/mole and a dispersity of Mw/Mn=1.5, 50%-[R]-0.50-atactic PHB, with a number average molecular weight of Mn=50,000 grams/mole and a dispersity of Mw/Mn=1.4, and 50%-[R]-0.66-syndiotactic PHB, polymerized from (±)-MPL with a $Sn(n-Bu)_3OCH_3$ initiator at 60° C., wherein this syn-PHB had a number average molecular weight of Mn=7700 grams/mole and a dispersity of Mw/Mn=1.1. The PHB polymer samples were melt cast into thin films between teflon coated glass plates at 160° C. for 10 minutes and annealed at 25° C. for at least 30 days. Each PHB film was then cut into 30 mm² rectangles and placed into separate reaction vessels containing 2 mL of double-distilled/de-ionized water deoxygenated with argon. Each reaction vessel was equilibrated at 30.0°±0.3° C. while magnetic stirring of the PHB film was initiated under an argon atmosphere. To initiate enzyme degradation, 5.0 μL of *P. funiculosum* exoenzyme esterase was added to each reaction vessel. Finally, to calculate the quantity of enzyme cleavage events, which each produce a free carboxylic acid end group, and resultant $H^+$ formation, pH was monitored, using a pH meter, as a function of time.

Figure 4:
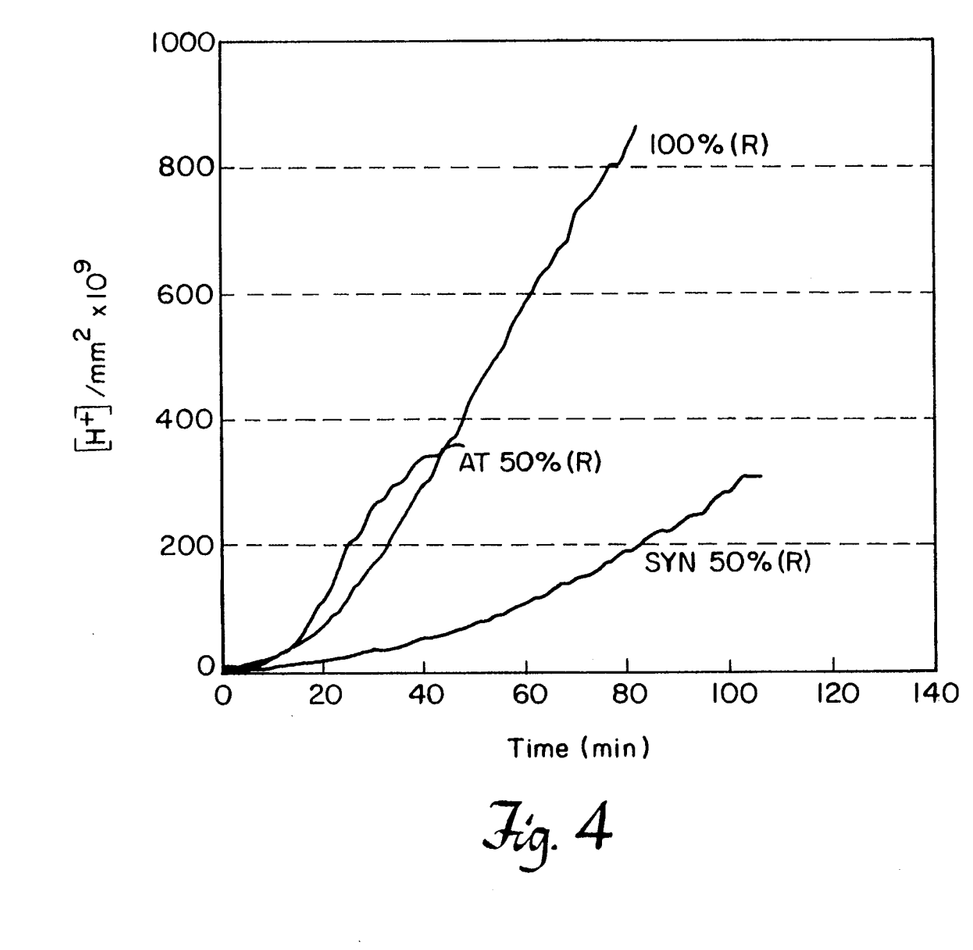
FIG. 4 is a plot of the relative rates of short-term surface degradation of melt cast films of [R]-isotactic PHB, 50%-[R]-0.50-atactic PHB and 50%-[R]-0.66-syndiotactic PHB by *P. funiculosum* exoenzyme esterase.

The relative rates of initial surface degradation of each PHB polymer is shown in FIG. 4. The natural-origin, 100%-[R]-isotatic PHB exhibited a substantial degradation rate which was substantially faster than the degradation rate observed for the 50%-[R]-0.66-syn-PHB sample. The 50%-[R]-0.50-atactic PHB sample showed a large initial degradation rate, of approximately $1.4 \times 10^{-8}$ $[H+]/mm^2$-minute, which then promptly dropped in rate to less than $3.0 \times 10^{-9}$ $[H+]/mm^2$-minute though the pH remained within the optimum range for enzyme-catalyzed PHB degradation. The 50%-[R]-0.66-syn-PHB exhibited a sustained degradation rate which was substantially slower than that of 100%-[R]-isotatic PHB. These results suggest that the rate of PHB degradation is dependent upon the percentage of [R]-repeat units and the stereosequence distribution in the PHB polymer. These results further suggest that stereoregulation in the PHB polymer affects the degree of biodegradability and that atactic PHB will not completely degrade due to possessing longer repeat unit sequence lengths of linked [S]-enantiomers.

For long-term degradation studies, 50%-[R]-0.50-atactic PHB, and the 50%-[R]-0.66-syn-PHB sample previously described, in either film or powder form, were separately mixed with 15 mL of 0.1M acetic acid/-sodium acetate buffer at pH 5.9. Powdered PHB/buffer mixtures were sonicated to obtain relatively smaller particle sizes to increase the available PHB surface area. A volume of 30 μL of *P. funiculosum* exoenzyme esterase was added to each PHB/buffer mixture which was then maintained at 30±0.3° C., while continuously magnetically stirring and argon purging, for an incubation period of 6 to 21 days.

Following the incubation period, each PHB mixture was centrifuged to remove the remaining water insoluble polymer and then the supernatant was decanted. The water insoluble polymers were triturated two times with 2 mL volumes of distilled water and the polymer and wash supernatant were then separated by centrifuging and decanting. The water insoluble polymer was then dried at room temperature in vacuo.

The supernatants were all combined and any water soluble degradation products, dissolved therein, were isolated by sequentially saturating the supernatant with sodium chloride, acidifying the supernatant, at 3° C., with 12M HCl until the pH was 1.5, and then extracting water soluble degradation products with diethyl ether at 3° C. for 48 hours by using a continuous liquid-liquid extractor. Rotary evaporation of the diethyl ether extract yielded said water soluble extraction products which were then reacted with excess diazomethane in diethyl ether to form corresponding methyl hydroxyacid degradation products.

The results of the long-term degradation studies are recorded in Table IV. Controls for the long-term degradation studies were established by omitting the addition of *P. funiculosum* exoenzyme esterase during identical studies on the PHB polymers. The average oligomer chain lengths for the methylated degradation products were determined by $^1$H NMR spectroscopy from comparative integration intensities of the end group methyl ester hydrogens and the methylene and methyl hydrogens in the oligomer repeat units.

The 50%-[R]-0.50-atactic PHB showed no significant weight loss, with or without enzyme, over a 21 day incubation period. The 50%-[R]-0.66-syn-PHB sample lost approximately 20% of its original weight after 6 days while the control 50%-[R]-0.66-syn-PHB had less than a 3% weight loss over 6 days. For all of the PHB incubations, with or without-enzyme, the molecular weights, and dispersity values, determined by GPC before and after incubation showed no significant change.

In addition, the water soluble oligomeric degradation products, when reacted with diazomethane and analyzed by 1H NMR, were an average length of 3±1 repeat units. No degradation products were found for the control experiments or the 50%-[R]-0.50-atactic PHB/enzyme incubation. These results suggest that predominantly syndiotactic PHB is biodegradable to low molecular weight oligomeric species. In addition, it appears that syn-PHB shows sustained degradation whereas atactic PHB does not. This suggests that the predominantly syndiotactic repeat unit stereosequence in 50%-[R]-PHB samples controls the amount and rate of degradation.

TABLE IV

| % [R] Content | Sample Form | Incubation Time (Days) | % Weight Loss | Mn$^a$ After Incubation (g/mol) | Mw/Mn$^a$ | Average Oligomer, Chain Length for the Degradation Products |
|---|---|---|---|---|---|---|
| 50 At$^b$ | Film | 21 | <1 | 47000 | 1.4 | c |
| Control$^d$ | Film | 21 | <1 | 49000 | 1.4 | c |
| Syn$^b$ | Powder | 6 | 20 | 7500 | 1.1 | 2.7 ± 0.7 |
| Control$^d$ | Powder | 6 | <3 | 7500 | 1.1 | c |

$^a$GPC measurements on the remaining water insoluble polymer.
$^b$At = Atactic and Syn = Syndiotactic.
$^c$No isolated degradation products.
$^d$No enzyme added.

Equivalents

Those skilled in the art will recognize, or be able to ascertain, using no more than routine experimentation, many equivalents to specific embodiments of the invention described specifically herein. Such equivalents are intended to be encompassed in the scope of the following claims.

We claim:

1. A high molecular weight polymer having a number average molecular weight of at least about 2,000 grams/mole, comprising a poly($\beta$-propioester), wherein said poly($\beta$-propioester) further comprises substituted-$\beta$-propioester repeat units at $\alpha$-positions of the poly($\beta$-propioester), and are distributed in a predominantly sydiotactic sequence, and wherein a substituent of said substituted-$\beta$-propioester repeat unit is selected from the group consisting essentially of a protected amino, protected thiol, protected hydroxyl, vinyl, alkyl, aryl, halogenated alkyl, halogenated aryl and ester functional groups, said halogenated alkyl and halogenated aryl functional groups having between about one and thirteen carbons per functional group.

2. A high molecular weight polymer having a number average molecular weight of at least about 2,000 grams/mole, comprising a poly($\beta$-propioester), wherein said poly $\beta$-propioester) comprises substituted $\beta$-propioester repeat units at $\beta$-positions of the poly($\beta$-propioester) and are distributed in a predominantly syndiotactic sequence, and wherein a substituent of said substituted-$\beta$-propioester repeat unit is selected from the group consisting essentially of a protected amino, protected thiol, protected hydroxyl, vinyl, alkyl, aryl, halogenated alkyl, halogenated aryl and ester functional groups, said halogenated alkyl and halogenated aryl functional groups having between about one and thirteen carbons per functional group.

3. The high molecular weight polymer of claim 2, wherein said substituent is a methyl group.

4. A high molecular weight polymer having a number average molecular weight of at least about 2,000 grams/mole, comprising a poly($\beta$-propioester), wherein said poly($\beta$-propioester) comprises substituted $\beta$-propioester repeat units at $\alpha$-positions and $\beta$-positions of the poly($\beta$-propioester) and are distributed in a predominantly syndiotactic sequence, and wherein a substituent of said substituted-$\beta$-propioester repeat unit is selected from the group consisting essentially of a protected amino, protected thiol, protected hydroxyl, vinyl, alkyl, aryl, halogenated alkyl, halogenated aryl and ester functional groups, said halogenated alkyl and halogenated aryl functional groups having between about one and thirteen carbons per functional group.

5. A high molecular weight polymer having a number average molecular weight of at least about 2,000 grams/mole, comprising a substituted poly($\beta$-propioester), wherein repeat units of said substituted-poly($\beta$-propioester) are distributed in a sequence and include a fraction of syndiotactic dyads which is greater than or equal to about 0.70.

6. A compostition of matter, comprising a high molecular weight predominantly syndiotactic polymer having a number average molecular weight of greater than about 2,000 grams/mole, and having the structural formula:

wherein n is greater than or equal to about 12 to R is selected from the group consisting essentially of a protected amino, protected thiol, protected hydroxyl, vinyl, alkyl, aryl, halogenated alkyl, halogenated aryl and ester functional groups, said halogenated alkyl and halogenated aryl functional groups having between about one and thirteen carbons per functional group.

7. A biodegradable copolymer comprising a high molecular weight predominantly syndiotactic substituted-poly($\beta$-propioester) having a number average molecular weight of greater than about 2,000 grams/mole.

8. The copolymer of claim 7, wherein said copolymer comprises a graft copolymer.

9. The copolymer of claim 7, wherein said copolymer comprises a block copolymer.

10. The copolymer of claim 7, wherein said copolymer comprises a diblock copolymer 11. A biodegradable blend of polymers comprising a high molecular weight predominantly sydiotactic substituted-poly($\beta$-propioester), having a number average molecular weight of at least about 2,000 grams/moles, and at least one other polymer, said other polymer being selected from the group consisting of poly($\epsilon$-caprolactone), cellulose acetate, natural-origin poly 3-hydroxy alkanoates, and polylactic acid, and wherein the amount of said other polymer of the blend is present in the range of between about one and ninety-nine percent by weight of said blend.

12. A high molecular weight predominantly syndiotactic copolymer, having a number average molecular weight of at least about 2,000 grams/mole, produced by polymerizing a mixture of substituted-$\beta$-propiolactone monomers, wherein each of at least two of the substituted-$\beta$-propiolactone monomers include different substituents.

13. A method for forming a high molecular weight polymer comprising the steps of:

a) combining a racemic substituted-$\beta$-propiolactone with a tin-containing organometallic initiator; and b) reacting the substituted-$\beta$-propiolactone in the presence of the tin-containing organometallic initiator to form a high molecular weight predominantly syndiotactic substituted-poly($\beta$-propioester) having a number average molecular weight of at least about 2,000 grams/mole.

14. A method of claim 13 wherein said organometallic initiator is selected from a group consisting essentially of tri(n-butyl)tin methoxide, di(n-butyl)tin dimethoxide, bis(tri(n-butyl)tin) oxide, bis(triphenyltin) oxide and tin bis(acetylacetonate).

15. A method of claim 14 wherein the substituted-$\beta$-propiolactone is racemic $\beta$-methyl, $\beta$-propiolactone.

16. A method for forming a high molecular weight diblock copolymer, having a number average molecular weight of at least about 2,000 grams/mole, of a predominantly syndiotactic substituted-poly($\beta$-propiolactone) component and a polyester component, comprising the steps of:

a) reacting the hydroxyl end-group of a syndiotactic substituted prepolymer with an organometallic molecule to form a syndiotactic substituted-poly($\beta$-propiolactone macroinitiator; and b) reacting the macroinitiator with a lactone to form a high molecular weight diblock copolymer, having a number average molecular weight of at least about 2,000 grams/mole, and having a syndiotactic substituted-poly($\beta$-propiolactone) component and a polyester component.

17. In a method for forming a substituted-poly($\beta$-propioester) polymer by combining a racemic substituted-$\beta$-propiolactone and a tin-containing organometallic initiator:

The improvement comprising reacting said substituted-$\beta$-propiolactone and said initiator to form a high molecular weight substituted-poly ($\beta$-propioester), having a number average molecular weight of at least about 2,000 grams/mole, wherein said substituted-poly($\beta$-propioester) has a predominantly syndiotactic repeat unit sequence distribution.

* * * * *